United States Patent
Ide et al.

(10) Patent No.: US 8,310,183 B2
(45) Date of Patent: Nov. 13, 2012

(54) MOTOR CONTROL DEVICE

(75) Inventors: Kozo Ide, Kitakyushu (JP); Masaki Hisatsune, Kitakyushu (JP)

(73) Assignee: Kabushiki Kaisha Yaskawa Denki, Kitakyushu-Shi (JP)

( * ) Notice: Subject to any disclaimer, the term of this patent is extended or adjusted under 35 U.S.C. 154(b) by 0 days.

(21) Appl. No.: 13/487,263

(22) Filed: Jun. 4, 2012

(65) Prior Publication Data
US 2012/0235609 A1     Sep. 20, 2012

Related U.S. Application Data (63) Continuation of application No. PCT/JP2010/069041, filed on Oct. 27, 2010.

(30) Foreign Application Priority Data

Dec. 24, 2009  (JP) .................................. 2009-292324

(51) Int. Cl.
*H02P 21/00* (2006.01)

(52) U.S. Cl. .................... 318/400.02; 318/798; 318/806; 318/807; 318/809

(58) Field of Classification Search ............. 318/400.02, 318/798, 806, 807, 809
See application file for complete search history.

(56) References Cited

U.S. PATENT DOCUMENTS

| 5,994,870 | A | 11/1999 | Kaneko et al. |
| 7,598,698 | B2 * | 10/2009 | Hashimoto et al. ........... 318/801 |
| 2001/0009359 | A1 | 7/2001 | Kinpara et al. |
| 2002/0060548 | A1 | 5/2002 | Iwaji et al. |

FOREIGN PATENT DOCUMENTS

| JP | 10-229699 | 8/1998 |
| JP | 2002-078392 | 3/2002 |
| WO | WO 01/22567 | 3/2001 |

OTHER PUBLICATIONS

International Search Report for corresponding International Application No. PCT/JP2010/069041, Nov. 22, 2010.

* cited by examiner

*Primary Examiner* — Walter Benson
*Assistant Examiner* — David Luo
(74) *Attorney, Agent, or Firm* — Ditthavong Mori & Steiner, P.C.

(57) ABSTRACT

A motor control device includes a current profile generator generating a current profile, a pilot voltage operator calculating a pilot pulse voltage, on the basis of the current profile, and adding the pilot pulse voltage to a voltage command on a d axis, a magnetic pole position detector detecting a position of a magnetic pole in the permanent magnet motor, on the basis of the pilot pulse voltage, a polarity identification evaluation current operator calculating a polarity identification evaluation current for identifying a polarity of the magnetic pole in the permanent magnet motor, on the basis of a current value on the d axis in the motor current that has been detected in synchronization with a period of PWM control, and a polarity detector outputting a phase correction amount, on the basis of a deviation between the polarity identification evaluation current and the current profile.

8 Claims, 8 Drawing Sheets

MOTOR CONTROL DEVICE

CROSS-REFERENCE TO RELATED APPLICATIONS

The present application is a continuation application of PCT/JP2010/069041, filed Oct. 27, 2010, which claims priority to Japanese Patent Application No. 2009-292324, filed Dec. 24, 2009. The contents of these applications are incorporated herein by reference in their entirety.

BACKGROUND OF THE INVENTION

1. Field of the Invention

The present invention relates to a motor control device.

2. Discussion of the Background

In order to detect the magnetic pole of the rotor in a motor, a typical control device makes use of the magnetic saturation. One example of such a motor control device is as follows.

U.S. Patent Application Publication No. 2002/0060548 discloses a motor control device, which applies a minute voltage change to a voltage command on a dc axis which constitutes an estimation magnetic pole axis of a motor. Then, this motor control device discriminates between polarities of the magnetic pole axes by making use of the difference between respective cycles in which ripple components of the electric currents are positive and negative, or the difference between respective current change rates on the positive and negative sides, in response to the applied minute voltage change. Further, the motor control device applies the minute voltage change to the above voltage commands on both of the dc axis and the qc axis that is orthogonal to the dc axis, and directly estimates the magnetic pole position of the motor, on the basis of the current ripple components on the respective axes.

The above-mentioned motor control device utilizes the magnetic saturation, namely, the difference between the inductances Ld on the N and S poles, and compares the difference between the conducting times of positive and negative motor currents generated in response to the minute voltage change, thereby detecting the polarity of the rotor magnetic pole.

However, the magnetic saturation property of motors is dependent on the magnetic materials used in the motors. In addition, neodymium magnets for industrial applications have a high magnetic operating point. Specifically, the magnetizing state of the magnetic circuit that is composed of the stator and the rotor in the motor is close to the saturation state of the hysteresis expressed by the B-H curve (or hysteresis loop), when no current flows through a motor. Therefore, it is difficult to monitor the influence of saturation by using such a minute voltage change.

SUMMARY OF THE INVENTION

According to one aspect of the present disclosure, a motor control device includes: a PWM power convertor which applies an AC voltage command based on voltage commands on d and q axes to a permanent magnet motor, the d axis representing a direction of a magnetic flux of the permanent magnet motor, the q axis being orthogonal to the d axis; a current detector which detects a motor current flowing through the permanent magnet motor, in synchronization with a period of PWM control; a current profile generator which generates a current profile; a pilot voltage operator which calculates a pilot pulse voltage, on the basis of the current profile, and adds the calculated pilot pulse voltage to the voltage command on the d axis; a magnetic pole position detector which detects a position of a magnetic pole in the permanent magnet motor, on the basis of both the motor current and the pilot pulse voltage; a polarity identification evaluation current operator which identifies a polarity identification evaluation current to be used to identify a polarity of the magnetic pole in the permanent magnet motor, on the basis of a current on the d axis in the motor current; and a polarity detector which identifies a polarity of the magnetic pole, on the basis of a deviation between the polarity identification evaluation current and the current profile, and outputs a phase correction amount.

According to another aspect of the present disclosure, a method of detecting a position of a magnetic pole by using a motor control device, includes: applying an AC voltage command based on voltage commands on d and q axes to a permanent magnet motor, the d axis representing a direction of a magnetic flux of the permanent magnet motor, the q axis being orthogonal to the d axis; detecting a motor current flowing through the permanent magnet motor, in synchronization with a period of PWM control; calculating a pilot pulse voltage, on the basis of a generated current profile; setting a value obtained by adding the pilot pulse voltage and the voltage command on the d axis to a new voltage command on the d axis; detecting a position of a magnetic pole in the permanent magnet motor, on the basis of both the motor current and the pilot pulse voltage; calculating a polarity identification evaluation current to be used to identify a polarity of the magnetic pole in the permanent magnet motor, on the basis of a current on the d axis in the motor current; identifying a polarity of the magnetic pole, on the basis of a deviation between the polarity identification evaluation current and the current profile; outputting 0 [rad] or $\pi$ [rad], depending on the result of identifying the polarity of the magnetic pole, as a phase correction amount; and setting a value obtained by adding the magnetic pole position and the phase correction amount to a new magnetic pole position.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

Embodiments will now be described with reference to the accompanying drawings, wherein like reference numerals designate corresponding or identical elements throughout the various drawings.

Figure 1:
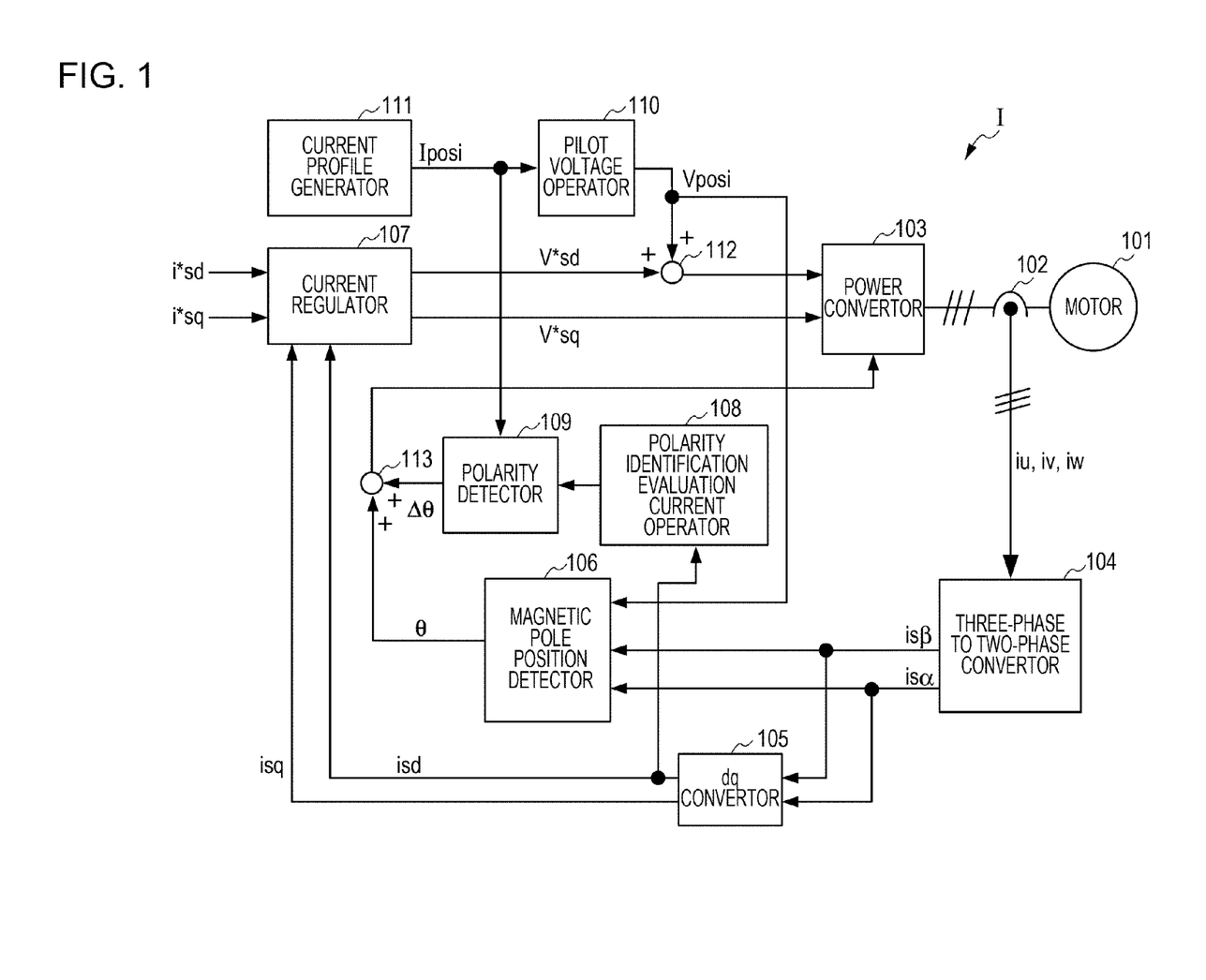
FIG. 1 is a block diagram of a motor control device according to a first embodiment of the present disclosure.

FIG. 1 is a block diagram of a motor control device I according to a first embodiment of the present disclosure.

The motor control device I includes a current detector 102, a power convertor 103, a three-phase to two-phase convertor 104, a dq convertor 105, a magnetic pole position detector 106, a current regulator 107, a polarity identification evaluation current operator 108, a polarity detector 109, a pilot voltage operator 110, a current profile generator 111, and adders 112 and 113. This motor control device I is configured to drive a motor 101.

The motor 101 is a target to be controlled and is composed of a permanent magnet motor. This motor 101 is controlled using a coordinate system having a magnetic flux direction (d axis) and a direction orthogonal thereto (q axis).

The current detector 102 detects a current flowing through the motor 101 in synchronization with a period of PWM control (described later), and outputs the detected result as a three-phase current (iu, iv, iw).

The power convertor 103 controls a DC bus voltage which is generated by rectifying an AC voltage input from an AC power supply (not shown), in accordance with the PWM control scheme and for each PWM switching period. In addition, this power convertor 103 generates a voltage command, on the basis of voltage commands on the d and q axes (V*sd, V*sq) (described later) and a value obtained by adding a magnetic pole position θ and a phase correction amount Δθ (both described later). Then, the power convertor 103 applies the generated voltage command to the motor 101.

The three-phase to two-phase convertor 104 converts a three-phase AC current (iu, iv, iw) into a two-phase AC current (isα, isβ).

The dq convertor 105 converts the two-phase AC current (isα, isβ) into currents on the d and q axes (isd, isq).

The magnetic pole position detector 106 detects a magnetic pole position θ, on the basis of the two-phase AC current (isα, isβ) and a pilot pulse voltage Vposi (described later).

The current regulator 107 adjusts current commands on the d and q axes (i*sd, i*sq) and the currents on the d and q axes (isd, isq) so as to match each other, respectively. Then, the current regulator 107 outputs the voltage commands on the d and q axes (V*sd, V*sq), as a controlled result.

The polarity identification evaluation current operator 108 is composed of a band-pass filter, and extracts, from the current on the d axis isd, a component having the same frequency as the pilot pulse voltage Vposi. Then, the polarity identification evaluation current operator 108 outputs the extracted component, as a polarity identification evaluation current idh. The above filter is tuned, such that a natural angular frequency thereof is the same as a frequency of a current profile Iposi (described later).

The polarity detector 109 identifies a polarity of a rotor magnetic pole, on the basis of the polarity identification evaluation current idh and the current profile Iposi. Then, the polarity detector 109 outputs the phase correction amount Δθ. An operation of the polarity detector 109 will be described later.

The pilot voltage operator 110 receives the current profile Iposi (described later) and, then calculates the pilot pulse voltage Vposi by multiplying the time derivative value of the current profile Iposi by an inductance setting value Ld*. Consequently, the pilot voltage operator 110 outputs this pilot pulse voltage Vposi to both the magnetic pole position detector 106 and the adder 112. The current profile Iposi is composed of a triangular wave signal, and therefore, the pilot pulse voltage Vposi is also composed of a square wave signal. In addition, both of these signals have the same period. The pilot pulse voltage Vposi corresponds to a pilot voltage used to detect the magnetic pole position. The inductance setting value Ld* is determined on the basis of a design value for a motor, an adjustment value upon test operation of a motor, an auto tuning technique conducted prior to the activation of a motor, or the like.

In this embodiment, the term "current profile" refers to a preset current variation pattern to be generated, when the operating point of a magnet contained in the motor is displaced in the minor loop portion of the hysteresis curve in response to the application of the pilot pulse voltage Vposi to the motor. The pilot pulse voltage Vposi is produced under the condition that the pilot pulse voltage Vposi does not exceed the maximum voltage which the power convertor is allowed to output, and a current fed by this pilot pulse voltage Vposi does not exceed the rated current of the motor. However, note that the above condition does not consider the influence of the magnetic saturation of the motor. The above-mentioned current variation pattern is composed of a current command signal in a constantly periodic triangular wave shape, and has the same positive and negative peak amplitudes with reference to the zero level. This current variation pattern may be set by the current peak value, the changing rate or the frequency.

The current profile generator 111 generates the current profile Iposi that is suitable for the motor 101 and, then outputs this current profile Iposi to both the polarity detector 109 and the pilot voltage operator 110. Note that the changing rate of the current profile Iposi is constant, and the frequency thereof is the same as that of the pilot pulse voltage Vposi. The cycle in which the current profile Iposi is generated is synchronized with the period of the PWM control, similar to the cycle in which the current detector 102 detects the three-phase current (iu, iv, iw). In addition, the current profile Iposi is detected at least four times within one cycle of generating the current profile Iposi. However, in this embodiment, the above-mentioned timings are not limited thereto. Alternatively, for example, the cycle of detecting the current profile Iposi may be set to be the same as the period of the PWM control and the half of the PWM switching period. In addition, the cycle of generating the current profile Iposi may be at least twice as long as the PWM switching period.

The adder 112 adds the pilot pulse voltage Vposi to the voltage command on the d axis V*sd and, then outputs the added result, as a new voltage command on the d axis V*sd.

The adder 113 adds the phase correction amount Δθ to the magnetic pole position θ and, then outputs the added result to a power convertor 103, as a new magnetic pole position θ.

Figure 2:
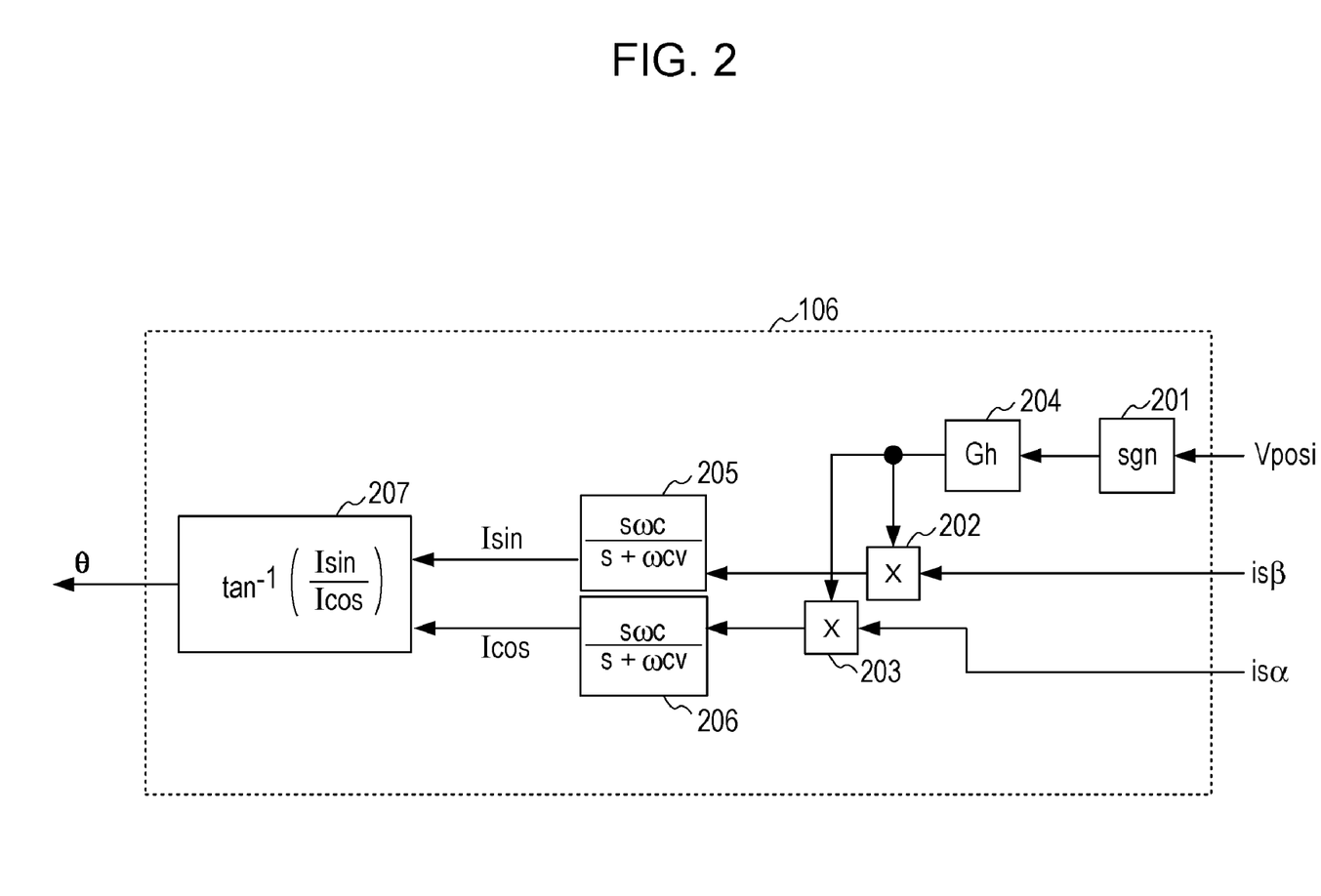
FIG. 2 is a block diagram of a magnetic pole position detector according to the first embodiment.

Next, a description will be given below of processing to be performed by the magnetic pole position detector 106, with reference to FIG. 2. As shown in this figure, the magnetic pole position detector 106 includes a code detector 201, multipliers 202 and 203, a gain amplifier 204, filters 205 and 206, and an arctangent operator 207. In addition, the magnetic pole position θ is calculated in synchronization with the cycle of adding the pilot pulse voltage Vposi to the voltage command on the d axis V*sd, namely, the cycle of generating the current profile Iposi.

The code detector 201 outputs "1" when the polarity of the pilot pulse voltage Vposi is positive, while outputting "−1" when the polarity thereof is negative.

The gain amplifier 204 multiplies the output of the code detector 201 by a gain Gh.

The multipliers 202 and 203 multiply the components α and β of the two-phase AC current (isα, isβ) by the output of the gain amplifier 204.

The filters 205 and 206 receive the respective outputs of the multipliers 202 and 203, and extract the peak values (I cos, I sin) from the components α and β, respectively. Each of the filters 205 and 206 is composed of an incomplete differentiator having the denominator of s+ωv, and the numerator of s·ωc (s: differential operator), and each of the natural angular frequencies ωcv and ωc has a predetermined value considering the prevention of the detection delay. As described above, each of the filters 205 and 206 extracts the peak value of the current by using the differential element of the numerator, and eliminates the switching noise by using the low-pass filter element of the denominator.

The arctangent operator 207 calculates the magnetic pole position θ, on the basis of the arctangent of the peak values (I cos, I sin).

In the above-mentioned manner, the magnetic pole position detector 106 detects the magnetic pole position θ, on the basis of the two-phase AC current (isα, isβ) and the pilot pulse voltage Vposi. Note that the magnetic pole position θ does not contain information regarding a polarity of the rotor magnetic pole.

Next, a description will be given of a principle of detecting the magnetic pole position θ and the polarity of the rotor magnetic pole, according to this embodiment. After that, a detailed operation of the polarity detector 109 will be described.

Referring to FIGS. 4 and 5A to 5E, first, a description will be given of the current profile Iposi and distortion of a generation current Ireal.

Figure 4:
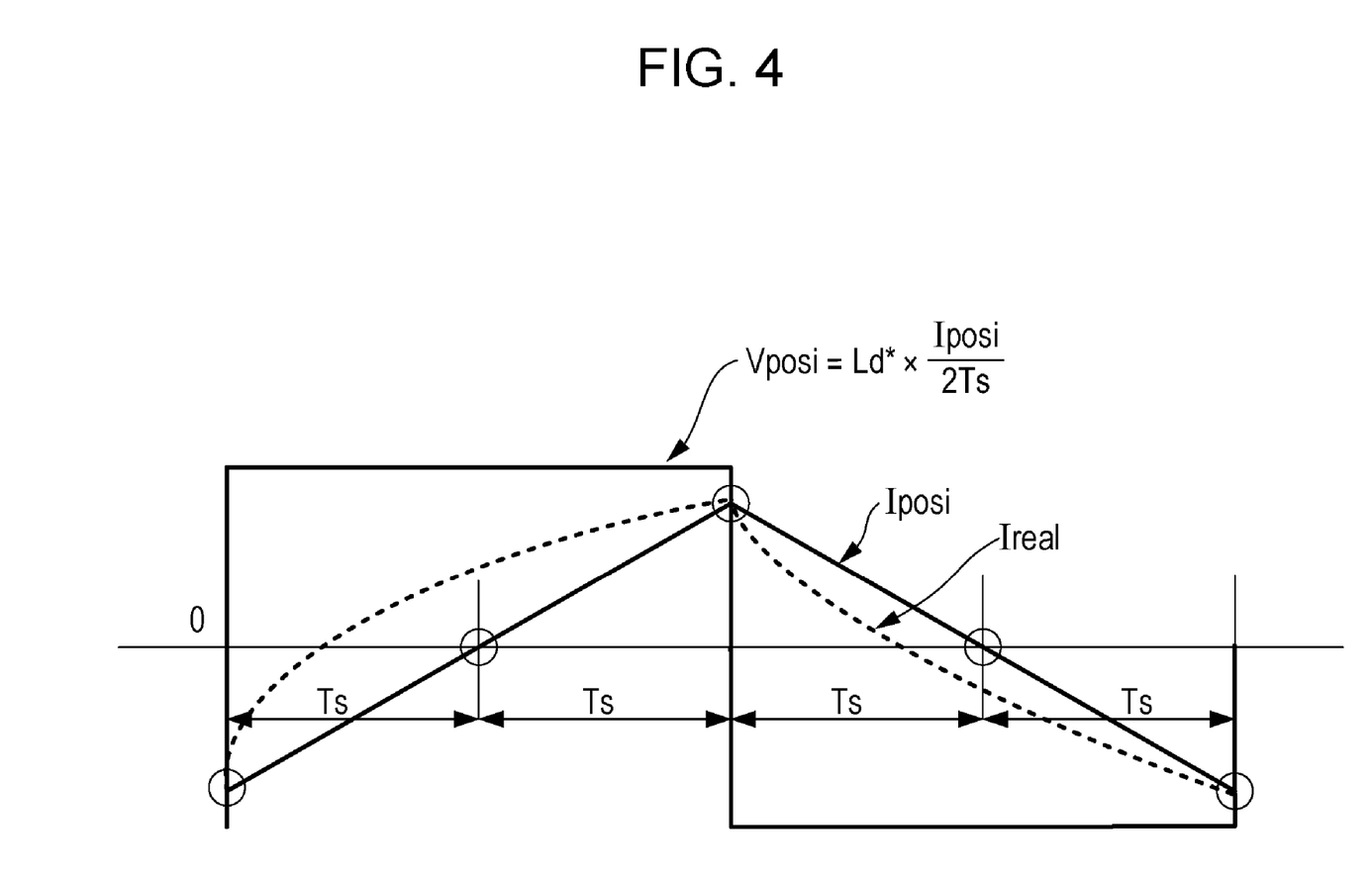
FIG. 4 is a view depicting current profiles and the distortion of a generation current according to the first embodiment.

FIG. 4 is a view for explaining the current profile Iposi and distortion of a generation current Ireal. FIG. 4 also shows a pilot pulse voltage Vposi that is to generate the current Ireal. As is found from this figure, the generation current Ireal is distorted due to the influence of the hysteresis loop. Note that FIG. 4 shows an example where the cycle of detecting the current profile Iposi is denoted by "Ts", and this current is detected four times within one period of the current profile Iposi that is a triangular wave signal.

Figure 5A:
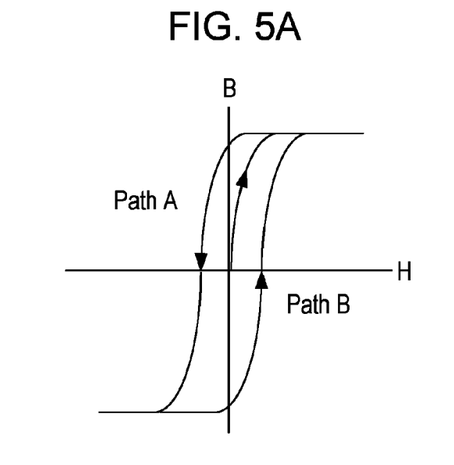
FIGS. 5A to 5E are views for explaining the hysteresis property and magnetization trajectory of a motor.
Figure 5B:
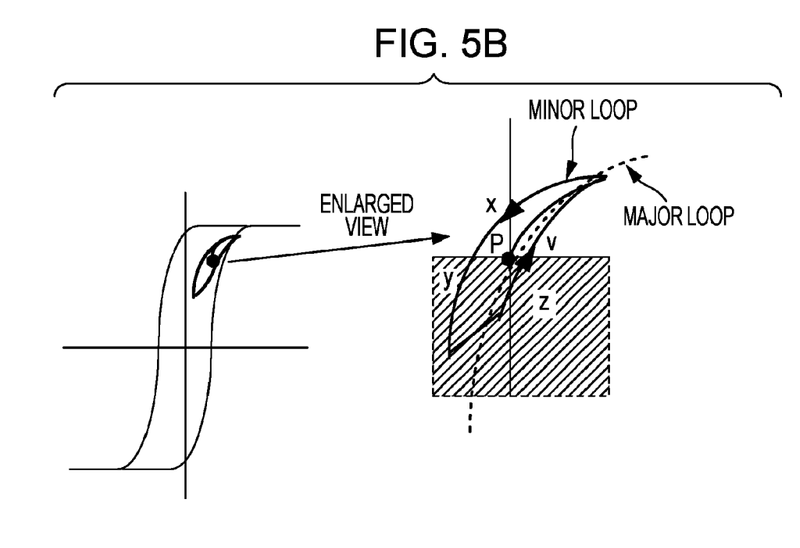
Figure 5C:
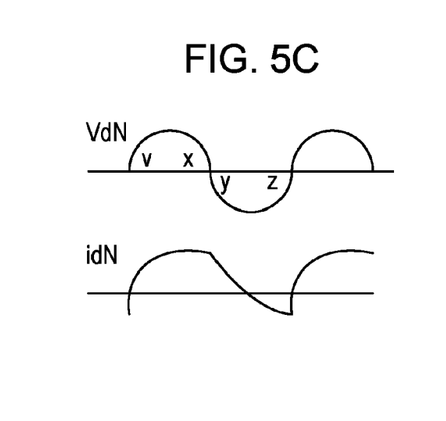
Figure 5D:
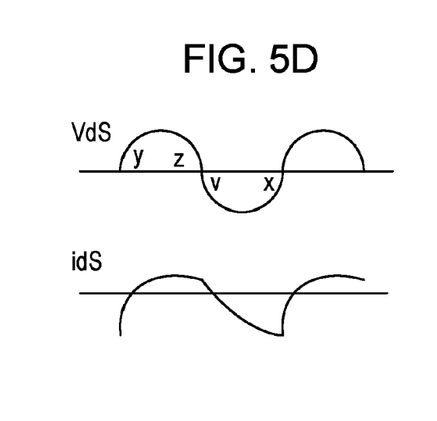
Figure 5E:
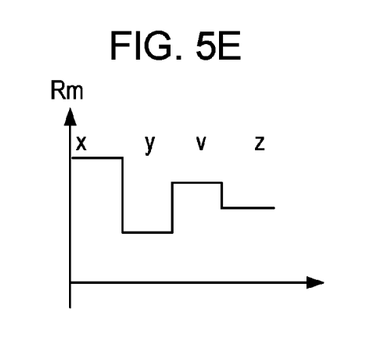

FIGS. 5A to 5E are views for explaining the hysteresis property that the motor 101 exhibits and the magnetization trajectory drawn by this hysteresis property. Specifically, FIG. 5A is a view for explaining the hysteresis property (major loop) of the motor 101, FIG. 5B is a view for explaining the partial hysteresis property (minor loop) of the motor 101, FIG. 5C is a view for explaining the magnetization trajectory drawn by an applied voltage VdN when the positive side of the applied voltage is applied to the N pole and the negative side is applied to the S pole, FIG. 5D is a view for explaining the magnetization trajectory formed by an applied voltage VdS when the positive side of the applied voltage is applied to the S pole and the negative side is applied to the N pole, and FIG. 5E is a view for explaining an approximated variation in a magneto resistance Rm.

Typically, a motor equipped with a rotor made of a permanent magnet exhibits a hysteresis property (a major loop) as shown in FIG. 5A. In FIG. 5A, a curve indicated by an arrow at the center of the hysteresis curve corresponds to an initial magnetization curve, and the magnetization curve forms a magnetization trajectory from a path A to a path B counterclockwise. When the applied voltages VdN (see FIG. 5C) or VdS (see FIG. 5D) are given to a motor having a magnetic operating point located at a point P in the left part of FIG. 5B, a partial hysteresis magnetization trajectory called a "minor loop" is generated, as shown in an enlarged view of FIG. 5B.

The magnetization trajectory formed by the applied voltage VdN as shown in FIG. 5C passes through regions v, x, y and z in this order, as in the right part of FIG. 5B. In this case, the generated current idN is distorted differently for each region, because a magneto resistance Rm within the v and x regions is greater than that within the y and z regions (or the shaded region). The magnetization trajectory formed by the applied voltage VdS as shown in FIG. 5D passes through the regions y, z, v and x in this order in the right part of FIG. 5B. In this case, the waveform of the generated current idS is the inverse of that of the current idN.

As the magneto resistance Rm increases, the inductance Ld decreases, and therefore, the response of the generated current increases. On the other hand, as the magneto resistance Rm decreases, the response of the generated current decreases. Accordingly, the generated current is distorted due to the influence of the hysteresis loop, and the current idS has a waveform similar to that of the current idN.

Figure 6:
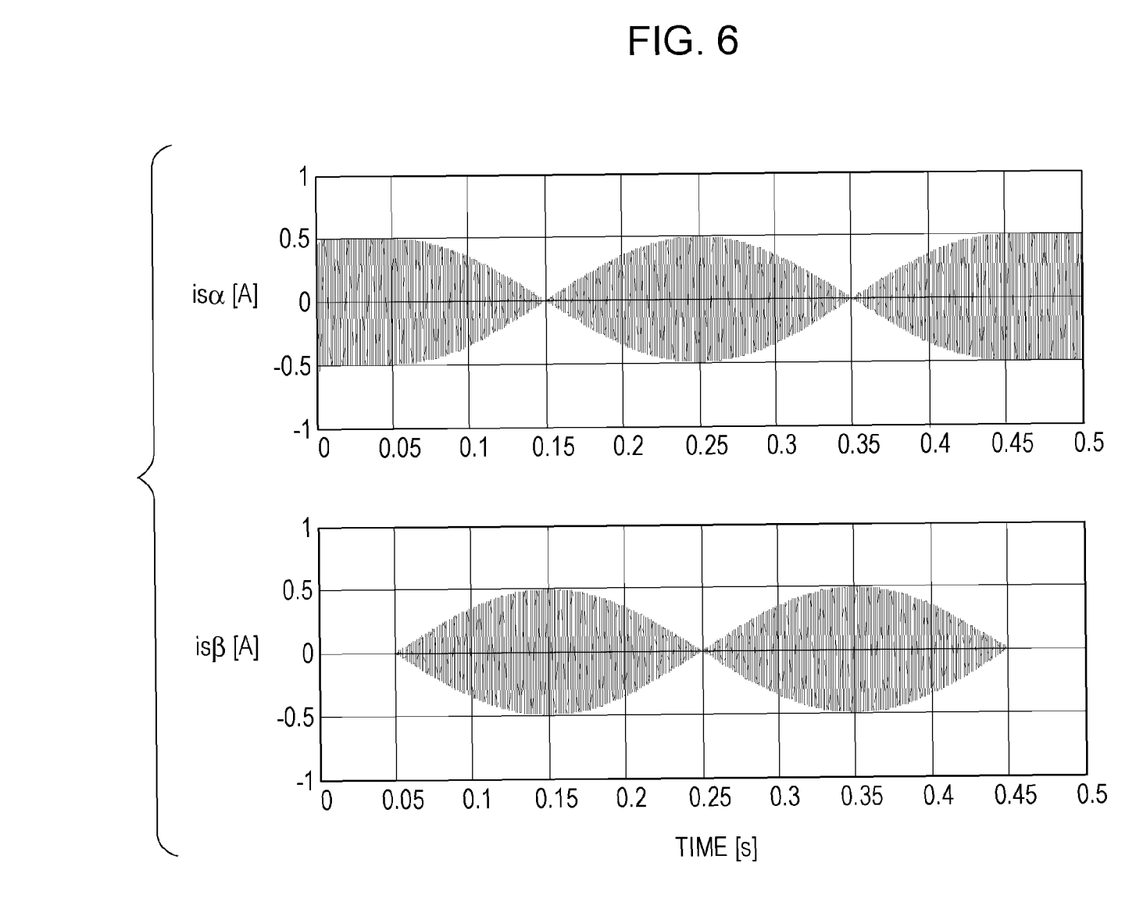
FIG. 6 is a view depicting generation current waveforms based on the current profile.

FIG. 6 shows generation current waveforms based on the current profile Iposi. The waveforms of FIG. 6 are obtained when the generation current produced on the basis of the current profile Iposi is observed in the form of the two-phase AC current (isα, isβ). For an interior magnet motor, since the magneto resistance Rm becomes greater in the direction where the polarity (N or S) of the permanent magnet in the rotor exists, the inductance Ld decreases. In contrast, the inductance Ld increases in the direction where the polarity of the permanent magnet in the rotor is absent. Thus, each waveform of FIG. 6 reveals that the peak value of the current changes with the distribution of the inductance.

Likewise, for a surface magnet motor, the path of the magnetic flux is partially narrowed near the bridge of the stator slot, due to the current generated on the basis of the current profile Iposi. Accordingly, in the vicinity of the bridge, the magneto resistance becomes higher, while the inductance Ld becomes lower. In addition, the inductance Ld becomes higher at the center of the stator core. Thus, the peak values of the two-phase AC current (isα, isβ) changes. This phenomenon appears when the motor 101, which is a target to be controlled, contains a stator core.

Next, a description will be given below of a technique for detecting a polarity of the magnetic pole of a rotor by utilizing the influence of the hysteresis loop that has been explained with reference to FIGS. 5A to 5E. As explained with reference to FIG. 4, the generation current Ireal is distorted due to the influence of the hysteresis loop. In this state, many of the distorted components in the generation current Ireal have twice as high a frequency as the applied pilot pulse voltage Vposi. The reason for this is as follows.

For example, during the first half of the cycle of the applied voltage VdN, the magnetization of the magnetic circuit passes through the region v from the operating point P on the hysteresis loop, as shown in FIG. 5B and, then reaches a point at which the magneto resistance Rm is minimal. Then, the magnetization passes through the region X, and returns to the vicinity of the operating point P. In addition, during the latter half of the cycle, the magnetization passes through the region Y from the vicinity of the operating point P, and reaches a point at which the magneto resistance Rm is maximum. Finally, the magnetization passes through the region z, and returns to the vicinity of the operating point P.

Assuming that the magneto resistance Rm has a constant value within each of the regions v, x, y and z, the values of the magneto resistance Rm for the respective regions can be approximated to those shown in FIG. 5E, on the basis of the applied voltage VdN or the generated current idN in FIG. 5C. Specifically, the one cycle in which the applied voltage VdN is changed corresponds to two cycles of the magneto resistance Rm. Further, the magneto resistance Rm within the v and x regions that are closer to the N pole has a value different from that within the y and z that are closer to the S pole. In more detail, the magneto resistance Rm within the region z has a value lower than that within the region x, and the magneto resistance Rm within the region y has a value lower than that within the region v.

For this reason, the generation current Ireal generated by the pilot pulse voltage Vposi has twice as high a frequency as the pilot pulse voltage Vposi. The amplitude of this frequency component is varied depending on which of the N and S poles the voltage is applied to, due to the change in the inductance as described above. In more detail, when the voltage is applied to the N pole, the negative amplitude of the frequency component that has twice as high a frequency as the pilot pulse voltage Vposi is greater than the positive one. Meanwhile, when the voltage is applied to the S pole, the positive amplitude of the frequency component is greater than the negative one.

The above-mentioned principle is applied to the detection of a polarity of the magnetic pole in the rotor. In fact, the polarity detector 109 that will be described below utilizes the property where the respective amplitudes on the positive and negative sides of the frequency component are varied, as described above. Since this technique makes use of the hysteresis property of a motor, the polarity detector 109 can detect the magnetic pole, even under the influence of magnetic saturation.

Figure 3:
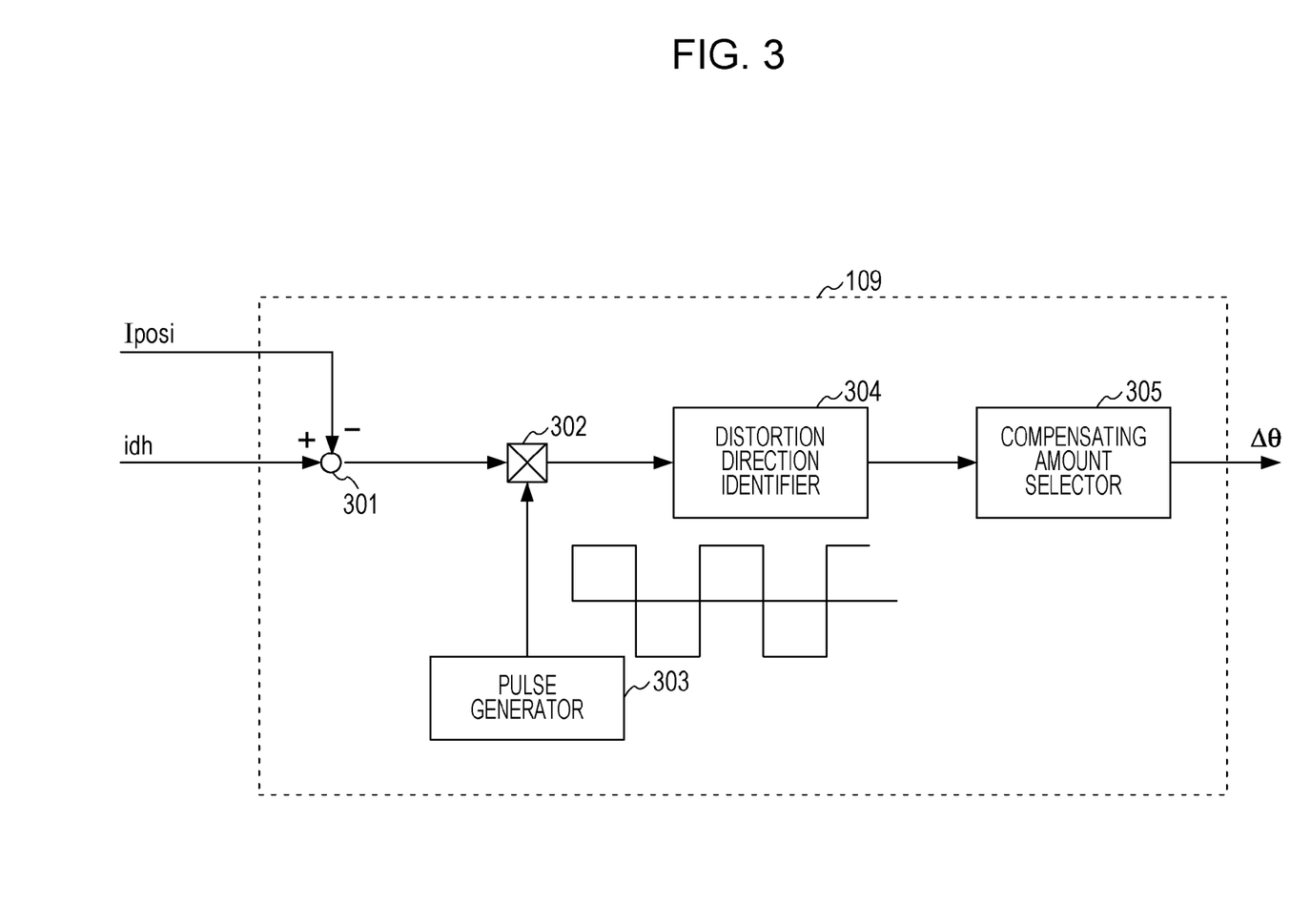
FIG. 3 is a block diagram of a polarity detector according to the first embodiment.

Next, a description will be given below of the polarity detector 109 according to this embodiment, with reference to FIG. 3. FIG. 3 is a block diagram of the polarity detector 109 according to this embodiment. As shown in this figure, the polarity detector 109 includes a subtracter 301, a multiplier 302, a pulse generator 303, a distortion direction identifier 304 and a compensating amount selector 305.

The subtracter 301 calculates the deviation between the identification evaluation current idh and the current profile Iposi.

The multiplier 302 multiplies the output of the subtracter 301 by the output of the pulse generator 303 which is composed of a pulse string having twice as high a frequency as the pilot pulse voltage Vposi. The DC component of this multiplied result contains information regarding on which of positive and negative sides the above variable amplitude is greater or distorted.

The distortion direction identifier 304 is composed of a low-pass filter or an integrator, and receives the output of the multiplier 302, then eliminating noise therefrom. By utilizing these functions, the distortion direction identifier 304 identifies the polarity of the extracted DC current. In other words, the distortion direction identifier 304 identifies the polarity of the magnetic pole, on the basis of the information regarding the distortion of the variable amplitude.

If the motor 101 is an interior magnet motor, the compensating amount selector 305 sets the phase correction amount $\Delta\theta$ to 0 [rad] when the output of the distortion direction identifier 304 is positive, while setting the value $\Delta\theta$ to $\pi$ [rad] when the output is negative. Following this, the compensating amount selector 305 outputs the phase correction amount $\Delta\theta$. On the other hand, if the motor 101 is a surface magnet motor, the compensating amount selector 305 sets the phase correction amount $\Delta\theta$ to $\theta$ [rad] when the output of the distortion direction identifier 304 is positive, while setting the value $\Delta\theta$ to 0 [rad] when the output is negative. Following this, the compensating amount selector 305 outputs the phase correction amount $\Delta\theta$. In this way, the polarity detector 109 identifies the polarity of the magnetic pole of the rotor, on the basis of both the polarity identification evaluation current idh and the current profile Iposi and, then outputs 0 [rad] or $\pi$ [rad] as the phase correction amount $\Delta\theta$.

As described above, the motor control device I of this embodiment makes use of the hysteresis property of the motor, in order to identify the polarity of the magnetic pole of the rotor. Accordingly, this identification does not depend on the influence of the magnetic saturation of the motor rotor. Moreover, by considering the current profile Iposi of the current flowing into the hysteresis loop, the magnetic pole position can be detected precisely in a short time.

Figure 7:
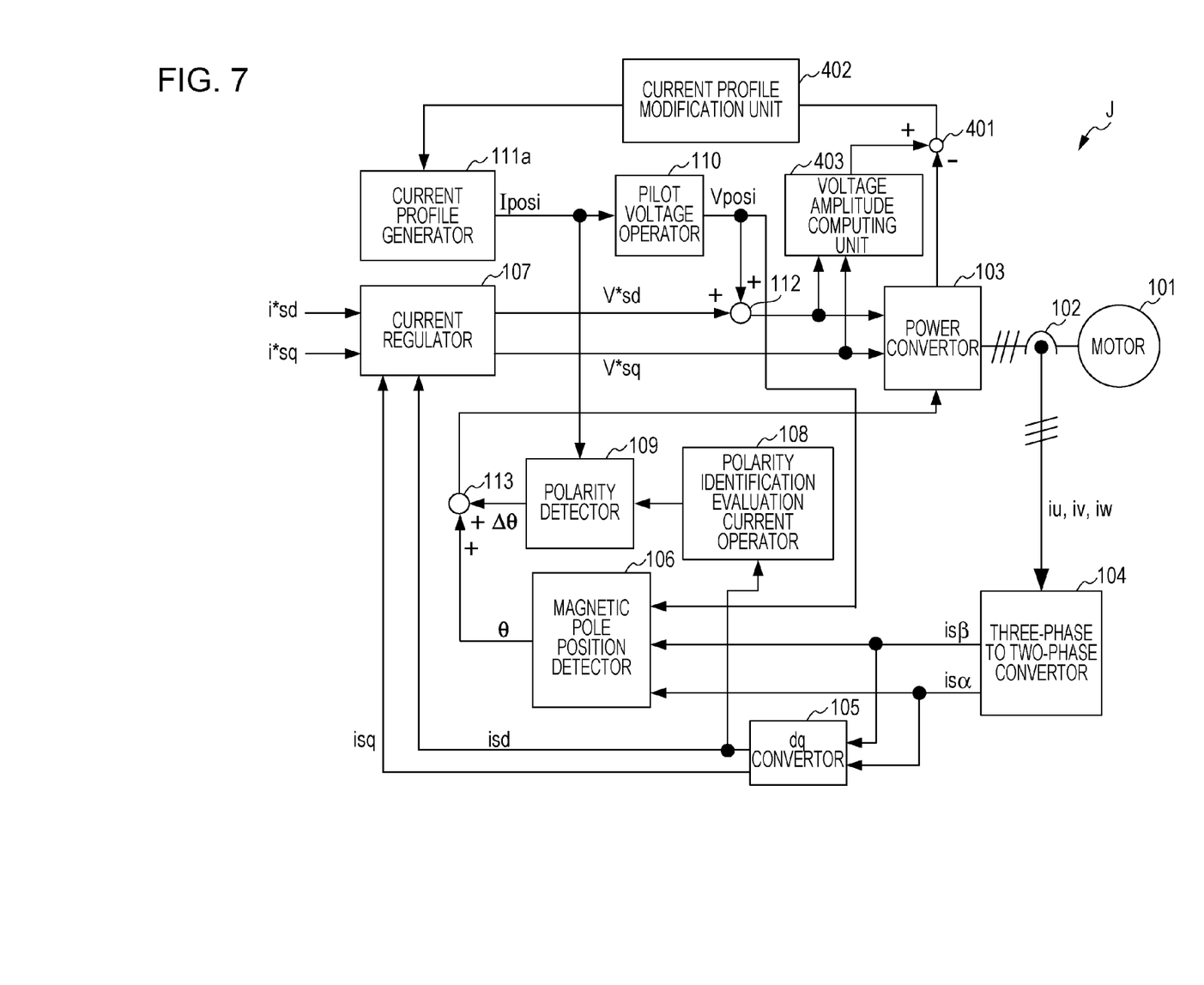
FIG. 7 is a block diagram of a motor control device according to a second embodiment of the present disclosure.

FIG. 7 is a block diagram of a motor control device J according to a second embodiment of the present disclosure.

As shown in FIG. 7, the motor control device J of the second embodiment differs from the motor control device I of the first embodiment shown in FIG. 1, in substituting a current profile generator 111a for the current profile generator 111, and in further including a subtracter 401, a current profile modification unit 402, and a voltage amplitude computing unit 403. The same reference numerals are given to components that operate in the same way as those of FIG. 1 do, and explanation thereof will be omitted as appropriate.

The current profile generator 111a has an additional function of decreasing the frequency of the current profile Iposi or the peak value thereof that is internally preset, in response to an instruction signal from the current profile modification unit 402.

The subtracter 401 calculates a differential value by subtracting a maximum voltage amplitude, which the power convertor 103 is allowed to output, from the amplitude of a command voltage computed by the voltage amplitude computing unit 403.

The current profile modification unit 402 determines whether to output a command signal, on the basis of the differential value which the subtracter 401 has calculated. Specifically, if the command voltage is equal to or less than the maximum voltage, namely, if the differential value is zero or a positive number, the current profile modification unit 402 outputs a command signal to the current profile generator 111a.

In response to the above command signal, the current profile generator 111a gradually extends the period of the current profile Iposi having a triangular current variation pattern, so as to decrease the frequency thereof. This adjustment is performed until the differential value calculated by the subtracter 401 becomes negative. In this case, it is preferable that an upper limit of the frequency, such as 5×Ts, be preset, and the peak value of the amplitude of the current be, in turn, decreased if the frequency exceeds the upper limit. This decreasing processing may be performed, for example in steps of 10% of the initial setting value. In this way, the current profile generator 111a adjusts and lowers the pilot pulse voltage Vposi output from the pilot voltage operator 110.

As described above, the motor control device J of the second embodiment is provided with the current profile modification unit 402 which modifies the current profile Iposi, in consideration of the maximum voltage amplitude that the power convertor 103 is allowed to output. Therefore, in addition to the effect that the motor control device I of the first embodiment provides, the motor control device J of the second embodiment provides an effect of robustly detecting a magnetic pole position, independently of the variation in a DC voltage on a bus, for example, due to the voltage drop of an input power source. Thus, the current profile modification unit 402 also modifies the current profile Iposi, when the voltage to be applied to the power convertor 103 is varied. Therefore, the above effect is prominent, especially when the power convertor 103 is composed of a voltage type invertor.

Figure 8:
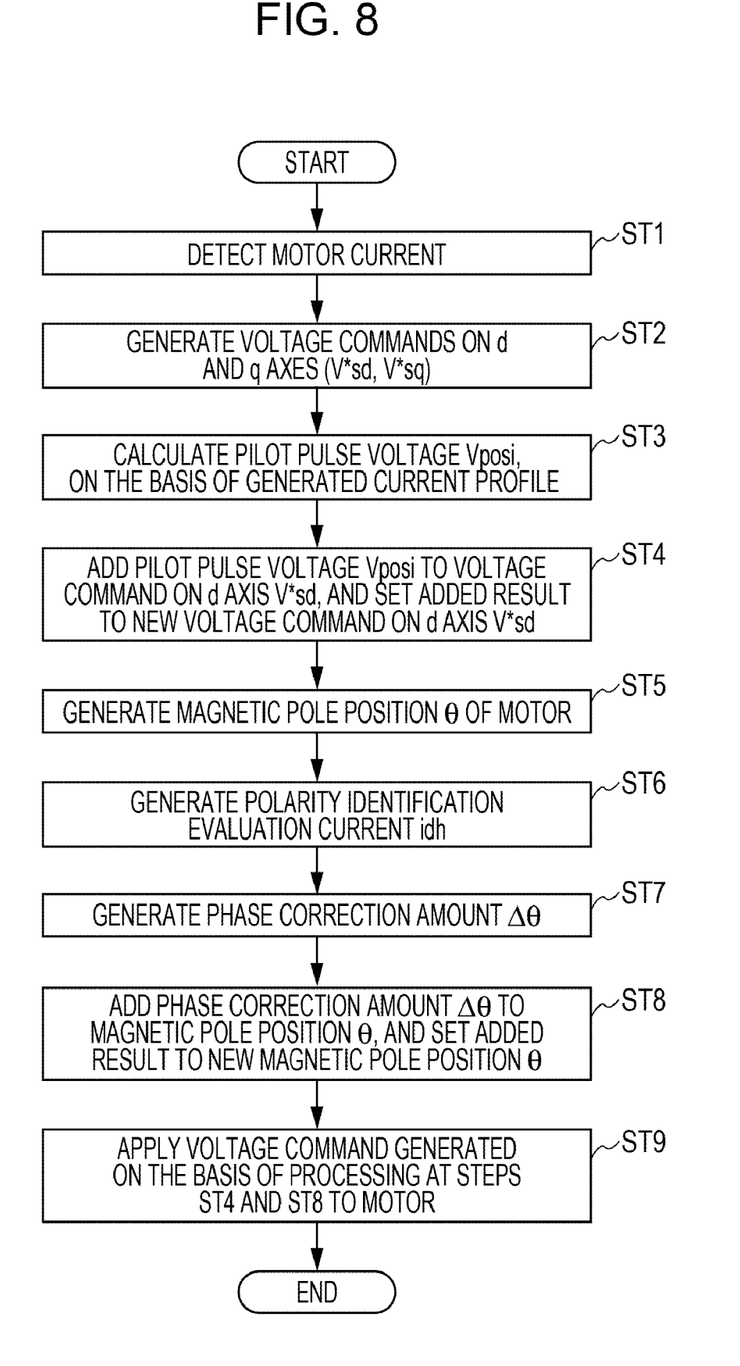
FIG. 8 is a flowchart of processing for detecting a magnetic pole position, which is to be performed by the motor control device according to a third embodiment of the present disclosure.

FIG. 8 is a flowchart of processing for detecting a magnetic pole position, which is to be performed by the motor control device according to a third embodiment of the present disclosure. Respective steps of this processing are repeated for each processing cycle. The steps will be described in accordance with the process order.

At a step ST1, the current detector 101 detects a motor current flowing through the motor 101 in synchronization with a period of PWM control. Subsequently, the three-phase to two-phase convertor 104 converts the detected three-phase current into a two-phase AC current (isα, isβ). Furthermore, the dq convertor 105 converts the two-phase AC current (isα, isβ) into currents on the d and q axes (isd, isq).

At a step ST2, the current regulator 107 executes current adjustment, such that current commands on the d and q axes (i*sd, i*sq) match currents on the d and q axes (isd, isq). As a result of this current adjustment, the current regulator 107 generates voltage commands on the d and q axes (V*sd, V*sq).

At a step ST3, the current profile generator 111 generates a current profile Iposi. Subsequently, the pilot voltage operator 110 calculates a pilot pulse voltage Vposi by multiplying the time derivative value of the current profile Iposi by an inductance setting value Ld*.

At a step ST4, the adder 112 adds the pilot pulse voltage Vposi to the voltage command on the d axis V*sd and, then sets the added result to a new voltage command on the d axis V*sd.

At a step ST5, the magnetic pole position detector 106 generates a magnetic pole position θ of the motor 101, on the basis of both the two-phase AC current (isα, isβ) and the pilot pulse voltage Vposi.

At a step ST6, the polarity identification evaluation current operator 108 extracts, from the current on the d axis isd, a component having the same frequency as the pilot pulse voltage Vposi. Then, the polarity identification evaluation current operator 108 generates the extracted component as a polarity identification evaluation current idh.

At a step ST7, the polarity detector 109 identifies a polarity of the magnetic pole of the rotor, on the basis of both the polarity identification evaluation current idh and the current profile Iposi and, then generates a phase correction amount Δθ.

At a step ST8, the adder 113 adds the phase correction amount Δθ to the magnetic pole position θ and, then generates a new magnetic pole position.

At a step ST9, the power convertor 103 converts the voltage commands on the d and q axes (V*sd, V*sq), which have been corrected at the step ST4, into a voltage command based on the magnetic pole position θ, which has been newly generated at the step ST8. Subsequently, the power convertor 103 applies the converted voltage command to the motor 101 under the PWM control.

Note that the detailed processes at the respective steps have already been explained upon description of the first and second embodiments. Therefore, explanation thereof will be omitted. In addition, although the third embodiment is executed in the above manner, the executing order thereof is not limited to the above.

Obviously, numerous modifications and variations of the present disclosure are possible in light of the above. It is therefore to be understood that within the scope of the appended claims, the disclosure may be practiced in a different way than as specifically described herein.

What is claimed as new and is desired to be secured by Letters Patent of the United States is:

1. A motor control device comprising:
    a power convertor which applies an AC voltage command based on voltage commands on d and q axes to a permanent magnet motor under PWM control, the d axis representing a direction of a magnetic flux of the permanent magnet motor, the q axis being orthogonal to the d axis;
    a current detector which detects a motor current flowing through the permanent magnet motor, in synchronization with a period of the PWM control;
    a current profile generator which generates a current profile;
    a pilot voltage operator which calculates a pilot pulse voltage, on the basis of the current profile, and adds the calculated pilot pulse voltage to the voltage command on the d axis;
    a magnetic pole position detector which detects a position of a magnetic pole in the permanent magnet motor, on the basis of both the motor current and the pilot pulse voltage;
    a polarity identification evaluation current operator which calculates a polarity identification evaluation current to be used to identify a polarity of the magnetic pole in the permanent magnet motor, on the basis of a current on the d axis in the motor current; and
    a polarity detector which identifies a polarity of the magnetic pole, on the basis of a deviation between the polarity identification evaluation current and the current profile, and outputs a phase correction amount.

2. The motor control device according to claim 1, wherein the magnetic pole position detector includes:
    a code detector which detects a polarity of the pilot pulse voltage;
    a first multiplier which multiplies a value output from the code detector by a predetermined gain;
    second and third multipliers which multiply an output of the first multiplier by respective components of a two-phase current contained in the motor current;
    a filter which extracts, from respective outputs of the second and third multipliers, peak values I cos and I sin of the two-phase current that is synchronized with a period of the pilot pulse voltage; and
    an arctangent operator which calculates the position of the magnetic pole, on the basis of arctangents of the peak values I cos and I sin.

3. The motor control device according to claim 1, wherein the polarity detector includes:
    a subtracter which calculates a deviation between the current profile and the polarity identification evaluation current;
    a pulse generator which generates a pulse string having twice as high a frequency as the pilot pulse voltage;
    a fourth multiplier which multiplies an output of the subtracter by the pulse string;
    a distortion direction identifier which determines a polarity of an AC component generated by superposing an output of the fourth multiplier through a low-pass filter or an integrator; and
    a compensating amount selector which outputs 0 [rad] or π [rad], depending on an output of the distortion direction identifier, as the phase correction amount.

4. The motor control device according to claim 1, wherein the polarity identification evaluation current operator includes a band-pass filter, a natural angular frequency of which is tuned to a frequency of the current profile, and extracts a component having the same frequency as the pilot pulse voltage from the current on the d axis contained in the motor current.

5. The motor control device according to claim 1, further comprising:
   a voltage amplitude computing unit which calculates an amplitude of a voltage command value to be input to the power convertor; and
   a current profile modification unit which modifies an amplitude or frequency of the current profile, if the amplitude of the voltage command value is equal to or more than a maximum voltage value that the power convertor is allowed to output.

6. The motor control device according to claim 2, further comprising:
   a voltage amplitude computing unit which calculates an amplitude of a voltage command value to be input to the power convertor; and
   a current profile modification unit which modifies an amplitude or frequency of the current profile, if the amplitude of the voltage command value is equal to or more than a maximum voltage value that the power convertor is allowed to output.

7. The motor control device according to claim 3, further comprising:
   a voltage amplitude computing unit which calculates an amplitude of a voltage command value to be input to the power convertor; and
   a current profile modification unit which modifies an amplitude or frequency of the current profile, if the amplitude of the voltage command value is equal to or more than a maximum voltage value that the power convertor is allowed to output.

8. The motor control device according to claim 4, further comprising:
   a voltage amplitude computing unit which calculates an amplitude of a voltage command value to be input to the power convertor; and
   a current profile modification unit which modifies an amplitude or frequency of the current profile, if the amplitude of the voltage command value is equal to or more than a maximum voltage value that the power convertor is allowed to output.

* * * * *